US007524067B2

(12) United States Patent
Sato (10) Patent No.: US 7,524,067 B2
(45) Date of Patent: Apr. 28, 2009

(54) PROJECTOR DEVICE, PROJECTING METHOD AND RECORDING MEDIUM IN WHICH PROJECTION CONTROL PROGRAM IS RECORDED

(75) Inventor: Shinichiro Sato, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 413 days.

(21) Appl. No.: 11/270,228

(22) Filed: Nov. 9, 2005

(65) Prior Publication Data

US 2006/0098167 A1 May 11, 2006

(30) Foreign Application Priority Data

Nov. 11, 2004 (JP) ............................. 2004-327692
Sep. 13, 2005 (JP) ............................. 2005-265286

(51) Int. Cl.
G03B 21/00 (2006.01)
G03B 21/26 (2006.01)
G09G 5/00 (2006.01)

(52) U.S. Cl. ............................. 353/42; 353/30; 353/71; 345/671

(58) Field of Classification Search ................ 353/42, 353/30, 71; 345/671
See application file for complete search history.

(56) References Cited

U.S. PATENT DOCUMENTS 6,910,778 B2   6/2005   Hamana et al.

2003/0067441 A1   4/2003   Hamana et al.
2005/0018144 A1*  1/2005   Wada et al. .................... 353/69
2005/0078879 A1*  4/2005   Sakurai et al. ............... 382/275

FOREIGN PATENT DOCUMENTS

| JP | 2977559 B2 | 9/1999 |
| JP | 2001-142602 A | 5/2001 |
| JP | 2003-173235 A | 6/2003 |
| JP | 2004-086277 A | 3/2004 |
| JP | 2004-193933 A | 7/2004 |

OTHER PUBLICATIONS

Japanese Office Action (and English translation thereof) dated Aug. 19, 2008, issued in a counterpart Japanese Application.
Japanese Office Action (and English translation thereof) dated Oct. 7, 2008, issued in a counterpart Japanese Application.

* cited by examiner

*Primary Examiner*—Diane I Lee
*Assistant Examiner*—Magda Cruz
(74) *Attorney, Agent, or Firm*—Frishauf, Holtz, Goodman & Chick, P.C.

(57) ABSTRACT

A projector device includes a region designating unit that designates a specific region with respect to an image projected, a determining unit that determines a length as a reference for enlargement of an image portion defined within the region designated by the region designating unit, an image enlarging unit that enlarges the image portion in the region based on the length as the reference determined by the determining unit and a size of an entire image, and an enlarged image projecting unit that projects the enlarged image enlarged by the image enlarging unit.

10 Claims, 10 Drawing Sheets

TRACK OF LASER BEAM

FIG.11B

POINTER 1
RECTANGULAR FRAME
POINTER 2

FIG.12A

TRACK OF LASER BEAM

FIG.12B

POINTER 1
RECTANGULAR FRAME
POINTER 2

PROJECTOR DEVICE, PROJECTING METHOD AND RECORDING MEDIUM IN WHICH PROJECTION CONTROL PROGRAM IS RECORDED

CROSS-REFERENCE TO RELATED APPLICATIONS

This application is based upon and claims the benefit of priority from prior Japanese Patent Applications No. 2004-327692, filed Nov. 11, 2004; and No. 2005-265286, filed Sep. 13, 2005, the entire contents of both of which are incorporated herein by reference.

BACKGROUND OF THE INVENTION

1. Field of the Invention

The present invention relates to a projecting device for projecting an image, such as a projector.

2. Description of the Related Art

Conventionally, projectors (projecting devices) carry out an image processing of digital zooming on an image signal of an image to be projected on a screen, and thus the image can be projected in an enlarged vision.

For example, in a conventional projector, the digital zooming of an image is carried out in the following manner. That is, a target region is displayed at a central position of enlargement of the image, and the image is enlarged with respect to the coordinates of the target region as its center of the enlargement operation.

Jpn. Pat. Appln. KOKAI Publication No. 2004-86277 discloses such a method that a guidance frame is displayed on an image, and a region to be enlarged is designated by enlarging, reducing and moving the guidance frame on the image, thereafter executing the enlargement of the image.

However, the image processing that enlarges an image using a target region set at the center of the enlargement, entails the following drawbacks. That is, for example, when a part of an image is to be displayed on a screen, the enlargement operation must be carried out for several times repeatedly, until the desired part of the image is placed in the entire screen.

With the method disclosed in Jpn. Pat. Appln. KOKAI Publication No. 2004-86277, it is possible to designate a region by enlarge/reduce the guidance frame, but the guidance of the predetermined shape must be used to designate the region. Therefore, in order to designate a desired region, the size and position of the guidance frame must be adjusted in repeated steps.

BRIEF SUMMARY OF THE INVENTION

According to an aspect of the present invention, there is provided a projector device comprising: a track detection unit that detects a track designated by an optical pointer on a projected image; a region designating unit that designates a specific region based on the track detected by the track detection unit; a determining unit that determines a length as a reference for enlargement of an image portion defined within the region designated by the region designating unit; an image enlarging unit that enlarges the image portion in the region based on the length as the reference determined by the determining unit and a size of an entire image; and an enlarged image projecting unit that projects the-enlarged image enlarged by the image enlarging unit.

According to another aspect of the present invention, there is provided a projector device comprising: a position designating unit that designates positions of at least two points on a projected image; a setting unit that sets a region having a configuration which is based on the points designated by the position designating unit; a determining unit that determines a length of a reference for enlargement of an image portion defined within the region having the configuration based on the designated points set by the setting unit; an image enlarging unit that enlarges the image portion in the region having the configuration based on the designated points, based on the length of the reference determined by the determining unit and a size of an entire image; and an enlarged image projecting unit that projects the enlarged image enlarged by the image enlarging unit.

According to still another aspect of the present invention, there is provided a projecting method comprising: designating a specific region with respect to an image projected; determining a length as a reference for enlargement of an image portion defined within the region designated in the designating of the region; enlarging the image portion in the region based on the length of the reference determined in the determining of the length and a size of an entire image; and projecting the enlarged image enlarged in the enlarging of the image portion.

According to still another aspect of the present invention, there is provided a projecting method comprising: designating positions of two points on an image projected; setting a rectangular frame having vertexes of its diagonal coincide with the two points designated in the designating of the positions; determining a length as a reference for enlargement of an image portion defined within the rectangular frame set in the setting of the frame; enlarging the image portion in the rectangular frame based on the length of the reference determined in the determining of the length and a size of an entire image; and projecting the enlarged image enlarged in the enlarging of the image portion.

According to still another aspect of the present invention, there is provided a projection controlling program stored in a computer-readable recording medium, the program comprising: means for instructing the computer to designate a specific region with respect to an image projected; means for instructing the computer to determine a length as a reference for enlargement of an image portion defined within the region designated in the designating of the region; means for instructing the computer to enlarge the image portion in the region based on the length of the reference determined in the determining of the length and a size of an entire image; and means for instructing the computer to project the enlarged image enlarged in the enlarging of the image portion.

According to still another aspect of the present invention, there is provided a projection controlling program stored in a computer-readable recording medium, the program comprising: means for instructing the computer to designate positions of two points on an image projected; means for instructing the computer to set a rectangular frame having vertexes of its diagonal coincide with the two points designated in the designating of the positions; means for instructing the computer to determine a length as a reference for enlargement of an image portion defined within the rectangular frame set in the setting of the frame; means for instructing the computer to enlarge the image portion in the rectangular frame based on the length of the reference determined in the determining of the length and a size of an entire image; and means for instructing the computer to project the enlarged image enlarged in the enlarging of the image portion.

Additional aspects and advantages of the invention will be set forth in the description which follows, and in part will be obvious from the description, or may be leaned by practice of the invention. The aspects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to accompanying drawings.

Figure 1A:
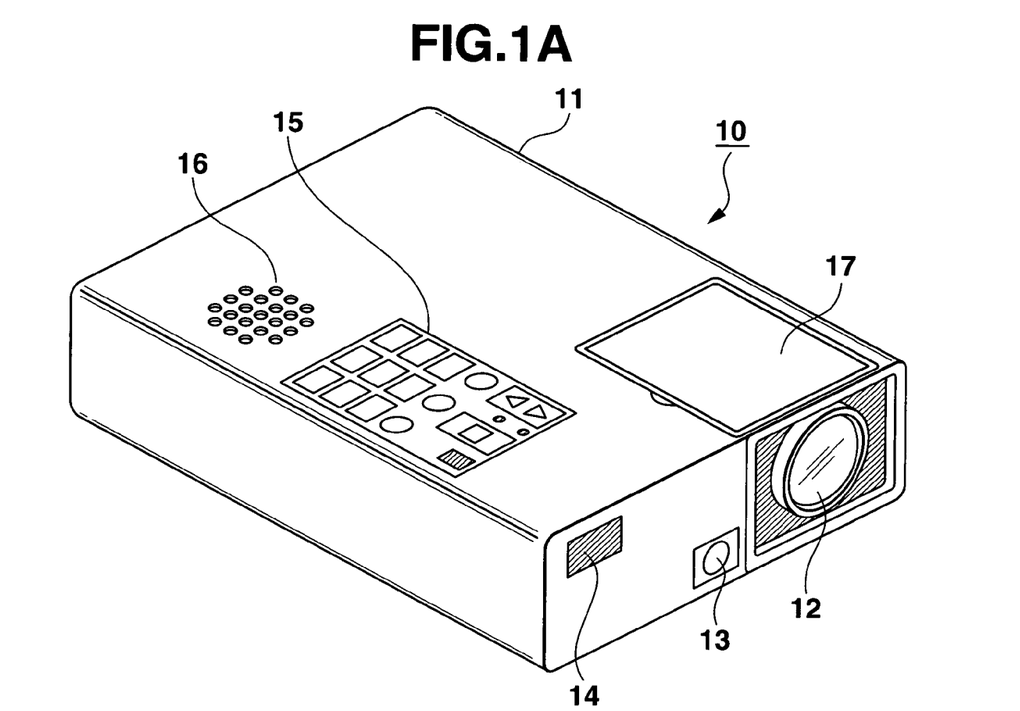
FIGS. 1A and 1B each are a diagram showing an perspective view of a projector device 10 according to each of the first to third embodiments of the present invention.
Figure 1B:
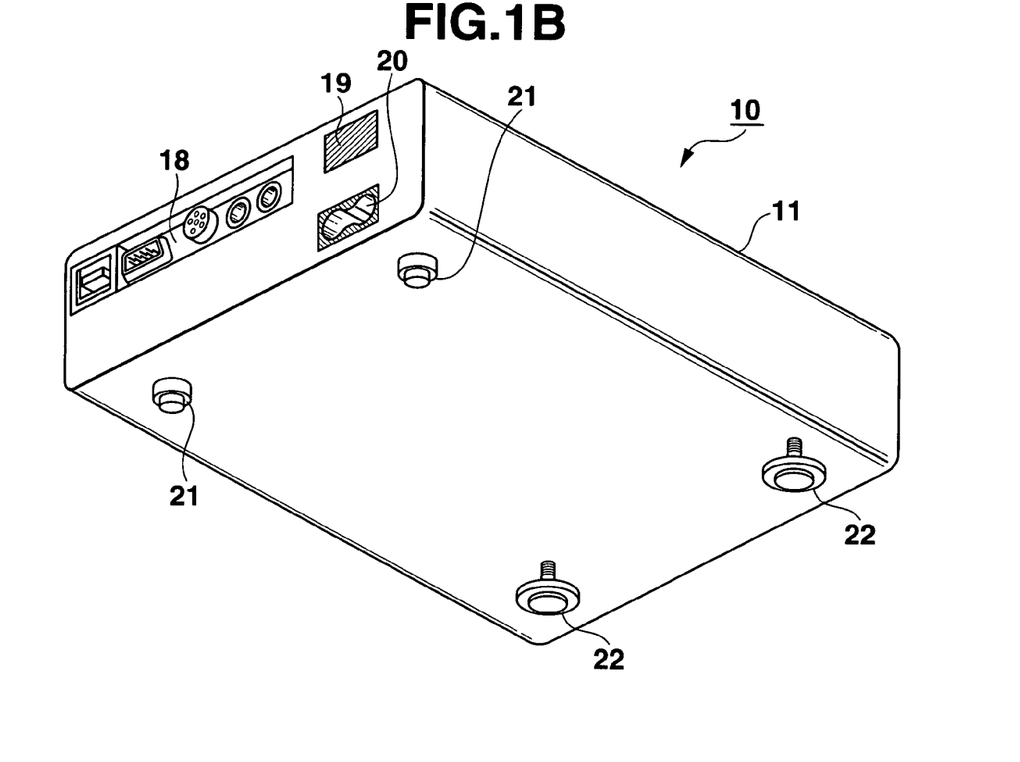

FIGS. 1A and 1B each are a diagram showing an perspective view of a projector device 10 according to each of the first to third embodiments of the present invention. The projector device 10 according to this embodiment receives signals of an image (video image) to be projected, input from other devices (for example, a personal computer) and projects the image on a screen. Then, the projector device 10 designates arbitrary two points on the projected image, and the device can zoom up the image within the region defined by the two points and projects it on the screen.

As shown in FIG. 1A, a projecting lens 12, a taking lens 13 and an Ir receiving unit 14 are provided on a front panel of a box-shaped casing 11 of the main body.

The projecting lens 12 is designed to project an optical image formed by a space optical modulation element such as a micro-mirror element, which will be describer later. In this embodiment, the lens 12 can arbitrarily change the focusing position and zooming position (projecting image angle).

The taking lens 13 is designed to shoot an image projected through the projecting lens 12.

The Ir receiving unit 14 is designed to receive infrared light on which a key operation signal is superimposed, from a remote controller (not shown) of the projector device 10.

The main key and indicator unit 15, a speaker 16 and a cover 17 are provided on an upper surface of the casing 11.

The details of the main key and indicator unit 15 will be discussed later.

The speaker 16 outputs the sound that comes with the moving image when it is played back.

The cover 17 is opened when sub-keys, which are not shown in the figure, are to be operated. With the sub-keys, various detailed functions that cannot be set or instructed with the keys of the main key and indicator unit 15 are manipulated without using the remote controller (not shown) of the projector device 10.

Further, as shown in FIG. 1B, an input/output connector unit 18, an Ir receiving unit 19 and an AC adaptor connecting unit 20 are provided on a back panel of the casing 11.

The input/output connector unit 18 includes a USB terminal used to connect the device to an external instrument such as a personal computer, a mini D-SUB terminal for video input, an S terminal, an RCA terminal and a stereo mini terminal for audio input, etc.

As in the case of the Ir receiving unit 14, the Ir receiving unit 19 is designed to receive infrared light on which a key operation signal is superimposed, from a remote controller (not shown).

The AC adaptor connecting unit 20 is connected to a cable from an AC adaptor (not shown), which serves as a power source.

In addition, a pair of fixed foot portions 21 are provided on a back panel side on a lower surface of the casing 11, and a pair of height adjustable foot portions 22 are provided on a front panel side. The adjustable foot portions 22 can change the heights by rotation of the screws. Thus, the vertical component of the projecting direction of the projecting lens 12, that is, the elevation angle, can be adjusted by changing the heights of the adjustable foot portions.

Figure 2A:
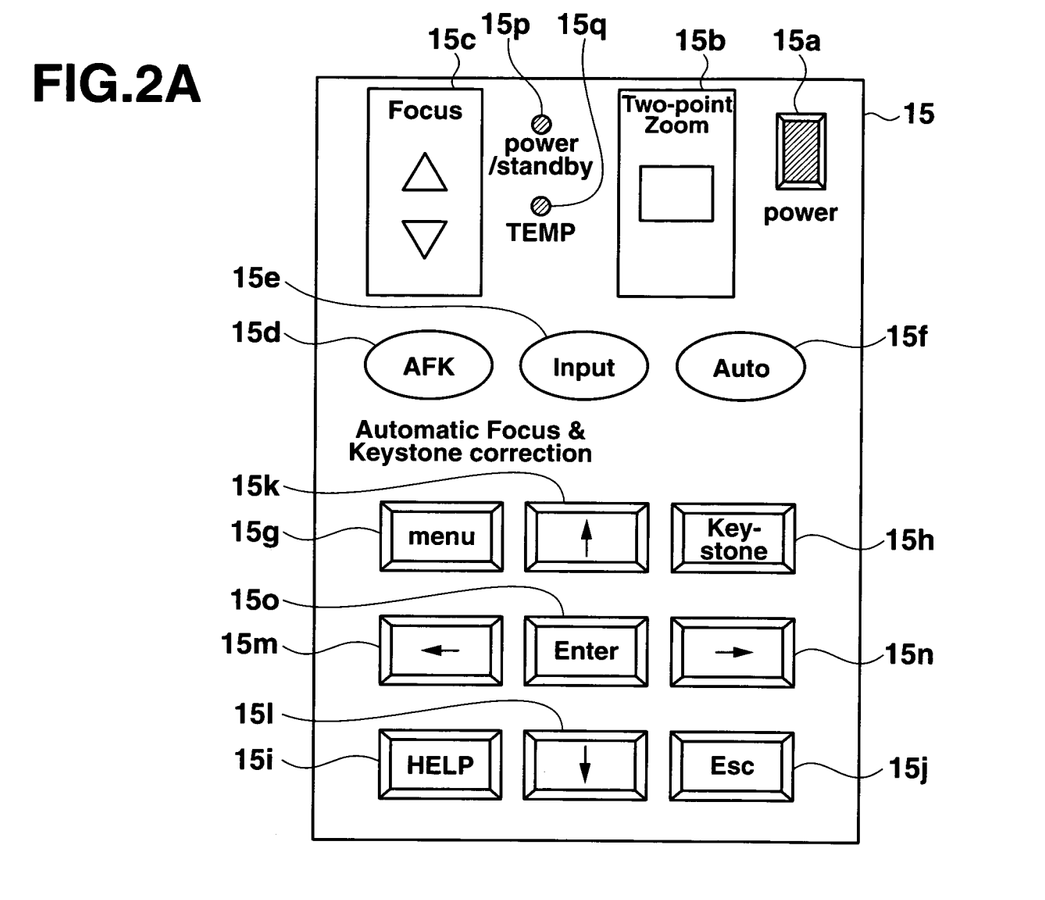
FIGS. 2A and 2B each are a diagram showing an arrangement of a main key and indicator unit 15 of the main body in detail according to each of the first to third embodiments of the present invention.

Next, with reference to FIG. 2A, an example of arrangement of the main key and indicator unit 15 will now be discussed in detail. The main key and indicator unit 15 includes a power key 15a, a two-point zoom key 15b, a focus key 15c, an "AFK" key 15d, an "Input" key 15e, an "Auto" key 15f, a "menu" key 15g, a "keystone" key 15h, a "HELP" key 15i, an "Esc" key 15j, an "Up (↑)" key 15k, a "Down (↓)" key 15l, a "Left (←)" key 15m, a "Right (→)" key 15n and an "Enter" key 15o, and a power/standby indicator 15p and a temperature (TEMP) indicator 15q.

The power key 15a is used to turn ON/OFF the power.

The two-point Zoom key 15b is used to assign two points (target points 1 and 2) that defines the region to be zoomed up in the image projected on the screen, and instruct execution of the enlargement process based on the two points.

The focus key 15c is used to instruct to move the focal point to a front direction or back direction by operating the buttons "Δ" and "∇".

The "AFK" key 15d is used to instruct the immediate execution of Automatic Focus and Automatic Keystone Correction.

The "Input" key 15e is used to instruct manual switching of an image signal to be input to either one of the connectors of the input/output connector unit 18, and the "Auto" key 15f is used to instruct automatic switching of an image signal to be input to either one of the connectors of the input/output connector unit 18.

The "menu" key 15g is used to instruct display of a menu contains various types of items regarding the projecting operation, and the "Keystone" key 15h is used to instruct manual operation of correction of keystone distortion.

The "HELP" key 15i is used instruct display of various help information items to be referred to when an instruction operation is not clear to the user, and the "Esc" key 15j is used to instruct release of the operation at the time the key is operated.

The "Up (↑)" key 15k, "Down (↓)" key 15l, "Left (←)" key 15m and "Right (→)" key 15n are so-called cursor keys, and they are operated in accordance with the occasion, for example, when a menu item, a manual keystone correction direction, a target point, a cursor, etc. are to be selected, or a moving direction is to be instructed.

The power/standby indicator 15p displays the ON/OFF state of the power and the state where no image signal is input, by means of lighting up and shutting off or blinking of LEDs of, for example, red and green.

The temperature indicator 15q displays whether or not the temperature of the lamp that serves as the light source of the image projection is in an appropriate state for projection, by means of lighting up and shutting off or blinking of LEDs of, for example, red and green.

Figure 2B:
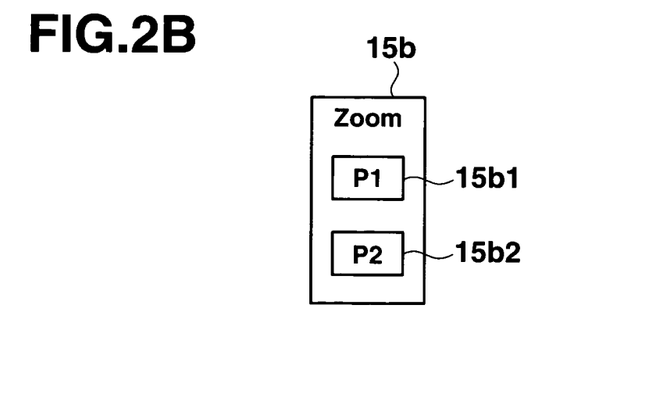

It should be noted that FIG. 2B illustrates the two-point zoom key 15b in the second embodiment, in which a pointer 1 key 15b1 and a pointer 2 key 15b2 are provided to designate two locations (target pointers 1 and 2) that define the region to be zoomed up in an image.

Figure 3:
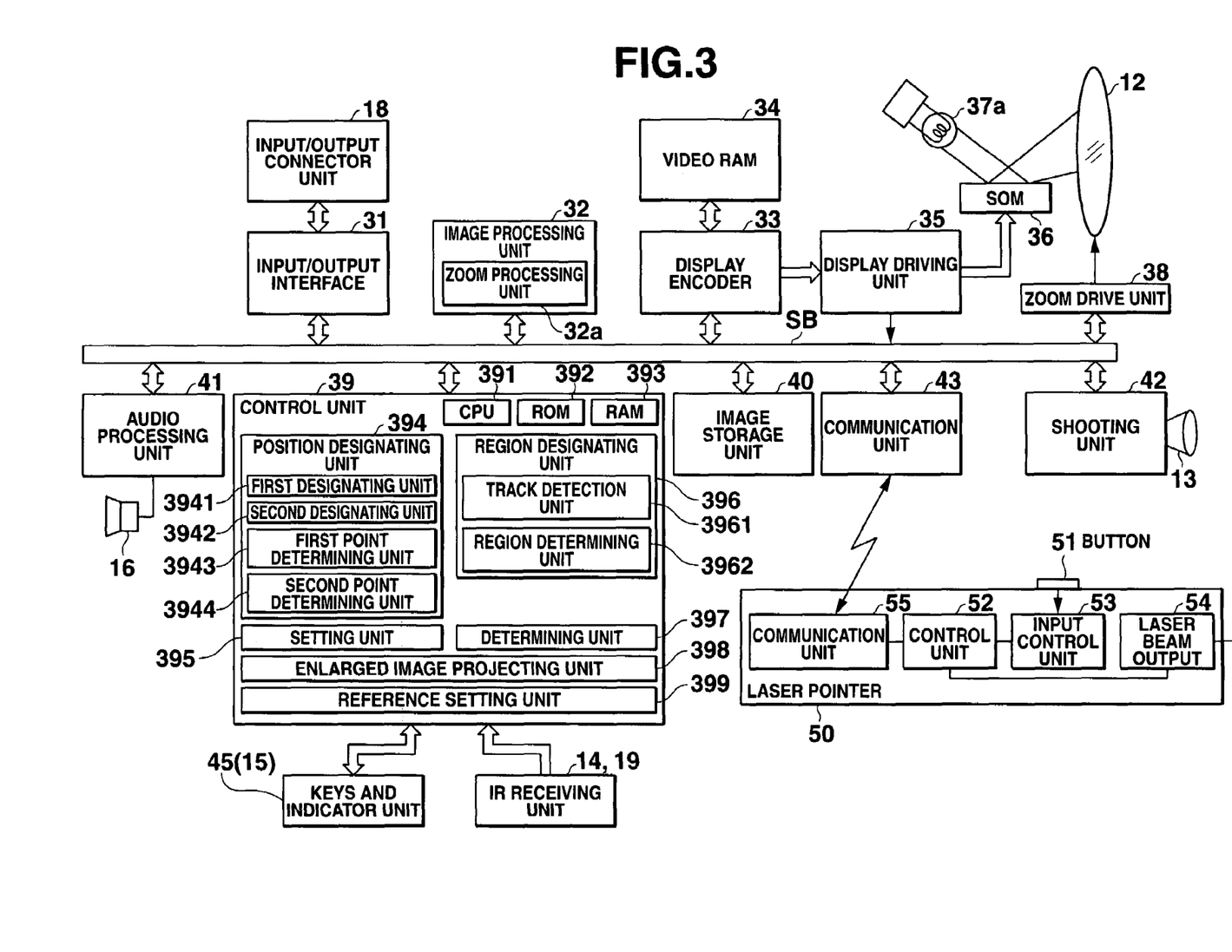
FIG. 3 is a block diagram illustrating a functional structure of electronic circuits of the projector device 10 according to each of the first to third embodiments of the present invention.

Next, the functional structure of the electronic circuits of the projector device 10 will now be described with reference to FIG. 3. As can be seen in FIG. 3, image signals of various types of specifications input through the input/output connector unit 18 are unified as image signals of a predetermined format by the image processing unit 32, and they are transmitted to a display encoder 33 via the input/output interface (I/F) 31 and the system bus SB.

When it is instructed to execute an image processing through the operation of the respective key provided in the main key and indicator unit 15, the image processing unit 32 executes the image processing corresponding to the instruction onto the image signals. For example, the image processing unit 32 is provided with a zoom processing unit 32a (image enlarging unit), which enlarges (zooms) an image based on the location of two points assigned by operating the two-point zoom key 15b on the image. Apart from this, the image processing unit 32 executes image processes including the keystone correction by operating the "AFK" key 15d.

The display encoder 33 develops and stores the transmitted image signals on a video RAM 34, and generates video signals from the memory contents of the video RAM 34, which are further output to a display driving unit 35.

The display driving unit 35 drives the space optical modulation element (SOM) 36 to display at an appropriate frame rate, for example, 30 [frames/second] with regard to the transmitted image signals. That is, white light of a high intensity emitted from a light source lamp 37 such as an ultrahigh pressure mercury light is irradiated to the space optical modulation element 36, and thus an optical image is formed by its reflection light, and then projected on a screen (not shown) via the projecting lens 12.

The projecting lens 12 is operated as the lens motor (M) is driven by the zoom driving unit 38, to move the zooming position and focal position as needed.

A control unit 39 manages to control the operation of all of the circuits, and has a function corresponding to a computer. The control unit 39 includes a CPU 391, a ROM 392 that fixedly stores the operation programs to be executed by the CPU 391, a RAM 393 used as a work memory, a position designating unit 394 that designates two points in an image to be projected (, which includes a first designating unit 3941, a second designating unit 3942, a first point determining unit 3943 and a second point determining unit 3944), a setting unit 395 that sets a rectangular frame, a region designating unit 396 that designate a specific region in a projected image (, which includes a track detection unit 3961 and a region determining unit 3962), a determining unit 397 that identifies a side and its length, based on which the image is enlarged, an enlarged image projecting unit 398 that projects the enlarged image, and a reference setting unit 399 that sets which side should be assigned as a reference. The control unit 39 executes a projection control program stored in the ROM, thereby controlling the image projecting operation that includes image enlargement, which will be described later.

An image storage unit 40, an audio processing unit 41, an shooting unit 42 and a communication unit 43 are connected to the control unit 39 via the system bus SB.

The image storage unit 40 is made of, for example, a flash memory, which stores image data of an image adjustment menu and a user logo image, which will be described later. The image storage unit 40, as required, reads the image data designated by the control unit 39 and display the images by the projecting lens 12 by projection.

The audio processing unit 41 includes a sound source circuit such as a PCM sound source, and it converts audio data given during the projection display operation into an analog data, which are then reproduced as a sound by driving the speaker 16.

The shooting unit 42 shoots an image projected on the screen by the taking lens 13, and detects the points designated by a laser pointer 50, which will be later described, from the projected image (see the third embodiment).

The communication unit 43 controls the short-distance radio communication and executes communications between the laser pointer (described later) and itself. The communication unit 43 receives an order of detecting a position designated on the screen with laser light from the laser pointer 50.

Although it is not illustrate, the projector device 10 is provided with a detection unit (acceleration sensor) that detects vibration occurring when the set state is changed, a distance measuring unit that measures the distance to the screen on which an image is projected, which is required for automatic focusing and automatic keystone correction, an illumination detection unit that detects an illumination of the surroundings where the projector device 10 is installed, etc.

It should be noted that the main key and indicator unit 15 and the sub-keys provided under the cover 17 form a key and indicator unit 45. A key operation signal made with the key and indicator unit 45 is directly input to the control unit 39. Further, while the control unit 39 directly driving the power and standby indicator 15p and the temperature indicator 15q to light up or blink, infrared light reception signals received by the Ir receiving unit 14 and the Ir receiving unit 19 are directly input to the control unit 38.

FIG. 3 illustrates the structure of the laser pointer 50 that can designate, with laser light, an arbitrary point in an image projected on the screen by the projector device 10. It should be noted that the laser pointer 50 is used to designate an arbitrary point in an image projected on a screen in the third embodiment, which will be described later.

The laser pointer 50 includes a button 51, a control unit 52, an input control unit 53, a laser light output unit 54 and a communication unit 55.

In this embodiment, the button 51 includes a first button operated to instruct output of laser light, and a second button operated to instruct confirmation of operation. The first button is designed such that it is operated in two steps when pushed. For example, when the button is pressed at a first step level (that is, pushed only halfway through), it is instructed to output laser light. Further, when the button is pressed at a second step level (that is, pushed only all the way through), it is instructed to detect the position on the screen pointed by the laser light.

The control unit 52 manages to control the laser pointer 50, and it acquires the status of the input operation by the button 51 through the input control unit 53, and controls an output of laser light by the laser light output unit 54, and communications made by the communication unit 55 with the projector device 10, etc.

The input control unit 53 is designed to detect an operation made by the button 51, and more specifically, it detects the first step level (, which is pushing the first button halfway through) or the second step level (, which is pushing it all the way though), and notifies it to the control unit 52.

The laser light output unit 54 applies laser light when the first button is pressed at the second step level (, which is halfway through) under control of the control unit 52.

The communication unit 55 is designed to control the communications with the projector device 10 under control of the control unit 52, and when the button 51 is pressed all the way though, the communication unit 55 sends a request of detecting the position pointed by the laser light output unit 54, to the projector device 10. When the second button is pressed, the communication unit 55 sends an instruction of confirmation to the projector device 10.

First Embodiment

Figure 4:
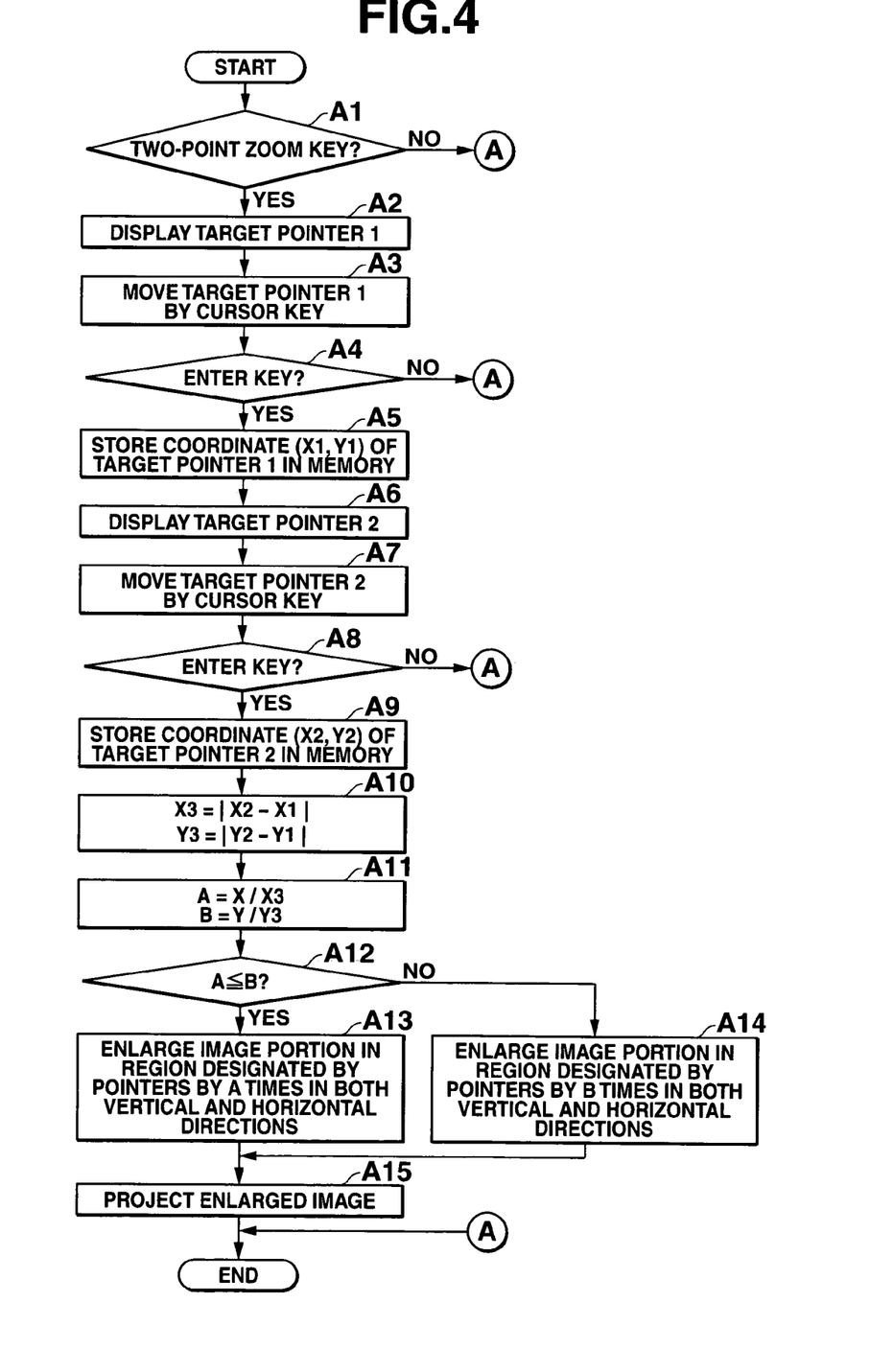
FIG. 4 is a flowchart illustrating an operation of the projector device 10 according to the first embodiment.

Next, the operation of the projector device 10 of the first embodiment will now be described with reference to the flowchart shown in FIG. 4.

The projector device 10 receives an input of an image signal from, for example, a personal computer, via the input/output connector unit 18, and projects an image corresponding to the image signal on the screen. Further, a remote controller is equipped for this embodiment. The controller has the same keys as those of the main body and with this controller, the same operations can be manipulated.

Here, when the two-point zoom key 15b is operated (step A1), the control unit 39 displays the target pointer 1 at an initially set position on the projected image (step A2).

For example, the rectangular frame that defines the region to be zoomed up is defined by the two points one at the upper left vertex of the diagonal and the other at the lower right vertex. The location initially assigned for the target pointer 1 is set at a point within a upper left quarter of the entire image to as to make it to easy toe determine the position of the upper left vertex of the rectangular frame.

Here, the cursor keys (the "Up" key 15k, the "Down" key 15l, the "Left" key 15m and the "Right" key 15n) are operated by the user, the control unit 39 moves the position of the target pointer 1 in accordance with the key operated (step A3). In order to determine the region to be enlarged, the position of the target pointer 1 can be arbitrarily adjusted.

After the adjustment of the position of the target pointer 1, the "Enter" key 15o is operated (that is, Yes in step A4). Thus, the control unit 39 stores the coordinates (X1, Y1) of the target pointer 1 at that situation in the memory, and the position of the target pointer 1 is determined (step A5).

Next, the control unit 39 displays the target pointer 2 at an initially assigned location in the projected image (step A6). In order to make it to easy to determine the position of the lower right vertex of the rectangular frame, the location initially assigned for the target pointer 2 is set at a point within a lower right left quarter of the entire image.

Then, as in the case of the target pointer 1, when the cursor keys (the "Up" key 15k, the "Down" key 15l, the "Left" key 15m and the "Right" key 15n) are operated by the user, the control unit 39 moves the position of the target pointer 2 in accordance with the key operated (step A7). In order to determine the region to be enlarged, the position of the target pointer 2 can be arbitrarily adjusted.

Figure 5A:
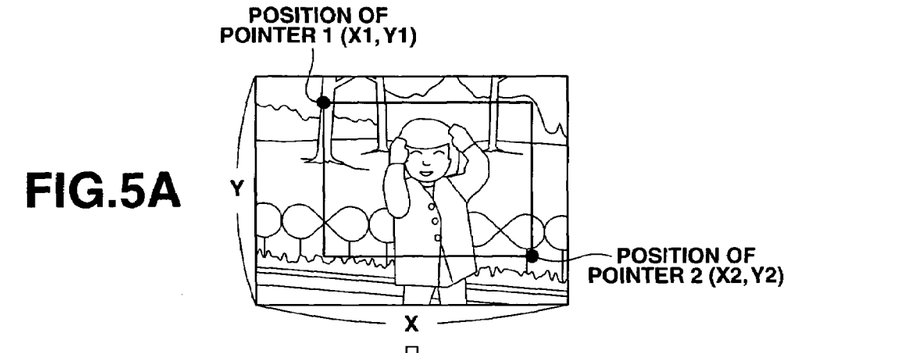
FIGS. 5A and 5B are diagrams showing an example of zooming a part of an image projected on a screen by designating target points 1 and 2 on the image in the first embodiment.

FIG. 5A shows an example of the case where a part of an image is zoomed up after assigning the target pointers 1 and 2 on the image projected on a screen.

FIG. 5A illustrates a state where target pointers 1 and 2 are assigned and the rectangular frame defined by the two points is set. The control unit 39 superimpose a mark and rectangular frame that indicate the target pointers 1 and 2 onto the projected image, so as to assist the user to be able to easily grasp the region of the part to be zoomed up in the image. The rectangular frame can be deformed while the position of the target pointer 2 is being adjusted.

Figure 5B:
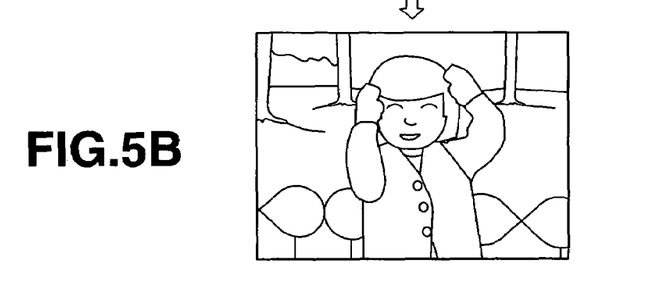

After setting the rectangular shape as shown in FIG. 5A, the image portion within the frame can be zoomed up to match the size (X, Y) of the entire image as show in FIG. 5B. In this case, the vertical-to-horizontal ratio of the rectangular frame defined by the two points is defined substantially the same as the vertical-to-horizontal ratio of the size (X, Y) of the entire image.

After the adjustment of the position of the target pointer 2, the "Enter" key 15o is operated (that is, Yes in step A8). Thus, the control unit 39 stores the coordinates (X2, Y2) of the target pointer 2 at that situation in the memory, and the position of the target pointer 2 is determined (step A9).

As described above, two points that define a region to be enlarged in an image are designated to set a rectangular frame.

Next, the control unit 39 obtains, based on the two sets of coordinates (X1, Y1) and (X2, Y2) stored in the memory, a length X3 of the side parallel to the X axis (that is, horizontal size) in the rectangular frame defined by the two points set at the diagonal vertexes, and a length Y3 of the side parallel to the Y-axis (that is, vertical side).

Then, for each of the vertical and horizontal sides of the rectangular axis, the zooming ratio used to enlarge the framed part to the size of the entire image is calculated. That is, the zooming ratio in the horizontal direction (A=X/X3) and the zooming ratio in the vertical direction (B=Y/Y3) are calculated (step A11).

Next, in the case where the zooming ratio A and the zooming ratio B are compared with each other and the result is "A≦B", that is, when the zooming ratio A in the horizontal direction is smaller than the zooming ratio B in the vertical direction, the image processing unit 32 controls the zoom processing unit 32a to enlarge the image portion in the rectangular frame defined by the target pointers 1 and 2 in accordance with the zooming ratio A, which is the smaller zooming ratio, that is, by A times, in both vertical and horizontal directions (step A13).

On the other hand, in the case where the zooming ratio A and the zooming ratio B are compared with each other and the result is not "A≦B", that is, when the zooming ratio A in the horizontal direction is larger than the zooming ratio B in the vertical direction, the image processing unit 32 controls the zoom processing unit 32a to enlarge the image portion in the rectangular frame defined by the target pointers 1 and 2 in accordance with the zooming ratio B, which is the larger zooming ratio, that is, by B times, in both vertical and horizontal directions (step A14).

The control unit 39 controls the display encoder 33 to develop and store the image enlarged by the zoom processing unit 32a on the video RAM 34. Thus, the image portion within the rectangular frame defined by the two points is enlarged and projected on the entire screen (step A15).

FIGS. 6A, 6B, 6C and 6D are diagrams illustrating the difference in zooming ratio in vertical and horizontal sides of the rectangular frame defined by the two points.

Figure 6A:
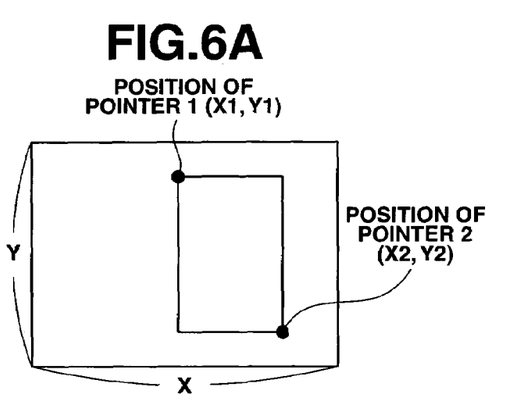
FIGS. 6A, 6B, 6C and 6D are diagrams illustrating the difference in zooming ratio in vertical and horizontal sides of a rectangular frame defined by the two points in the first embodiment.

FIG. 6A shows a case where a vertically oriented rectangular frame is assigned by specifying the target pointers 1 and 2. In this case, the zooming ratio B in the vertical direction is smaller than the zooming ratio A in the horizontal direction, and therefore the image portion in the rectangular frame is enlarged by the zooming ratio B, and the enlarged image portion is projected as can be seen in FIG. 6B.

Figure 6B:
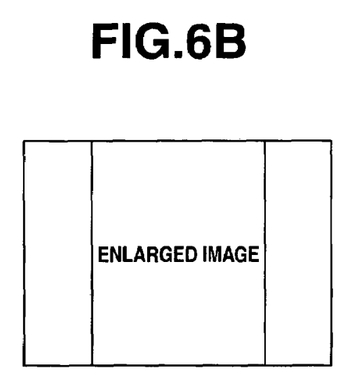
Figure 6C:
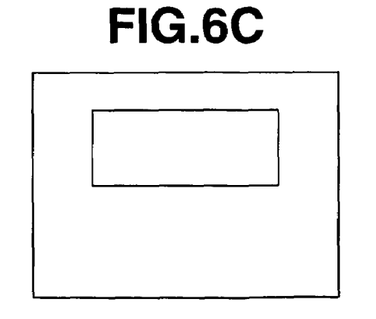

FIG. 6C shows a case where a horizontally oriented rectangular frame is assigned by specifying the target pointers 1 and 2. In this case, the zooming ratio A in the horizontal direction is smaller than the zooming ratio B in the vertical direction, and therefore the image portion in the rectangular frame is enlarged by the zooming ratio A, and the enlarged image portion is projected as can be seen in FIG. 6D.

Figure 6D:
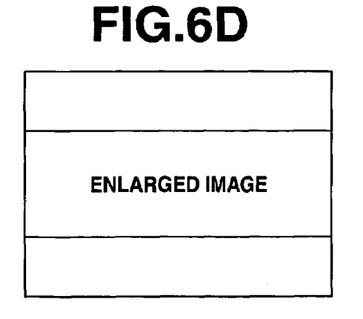

As shown in FIG. 6B and 6D, the enlarged image is placed at the center of the screen to be projected. In this case, the image portion of the region (within the rectangular frame) defined by the user using the two points is projected on the entire screen.

In the above-provided descriptions, the side of the smaller zooming ratio is selected out of the vertical and horizontal sides of the rectangular frame that defines the region to be zoomed up, and the image is zoomed up based on the side of the smaller zooming rate for the enlargement of an image. However, it is alternatively possible to preset on which one of the sides having the smaller zooming rate and the larger zooming rate is to be based for the enlargement of the image.

For example, the setting process is started from the menu displayed by the operation of the "menu" key 15g. In this setting process, a request of the user is input and the requested one of the sides having the smaller zooming rate and the larger zooming rate is to be based on for the enlargement of the image is assigned.

In accordance with the above-described setting, the control unit 39 switches the identification process in step A12. That is, in the case where the zooming is to be carried out based on the side of the smaller zooming ratio, "A≦B" is identified in step A13, as described above. On the other hand, in the case where the zooming is to be carried out based on the side of the larger zooming ratio, "A>B" is identified. In the case where "A>B" is identified, the image portion within the rectangular frame defined by the target pointers 1 and 2 is enlarged by A times in both the vertical and horizontal directions.

FIGS. 7A, 7B, 7C and 7D are diagrams illustrating the zooming of a part of an image in the case where the side of a larger zooming ratio is based on for the enlargement of the image part.

Figure 7A:
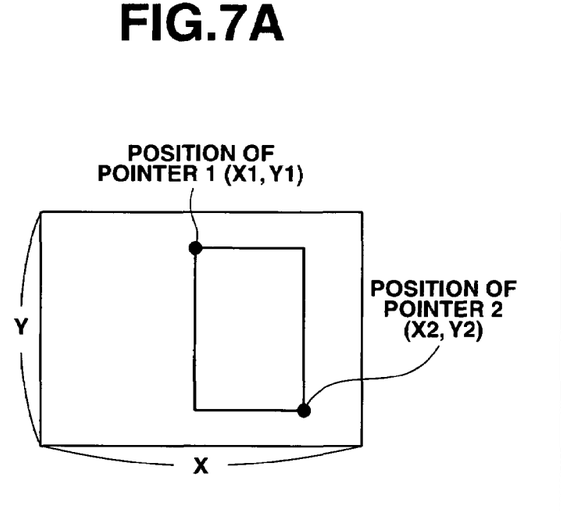
FIGS. 7A, 7B, 7C and 7D are diagrams illustrating the zooming of a part of an image in the case where the side of a larger zooming ratio is set as a reference of the zooming ratio in the first embodiment.
Figure 7B:
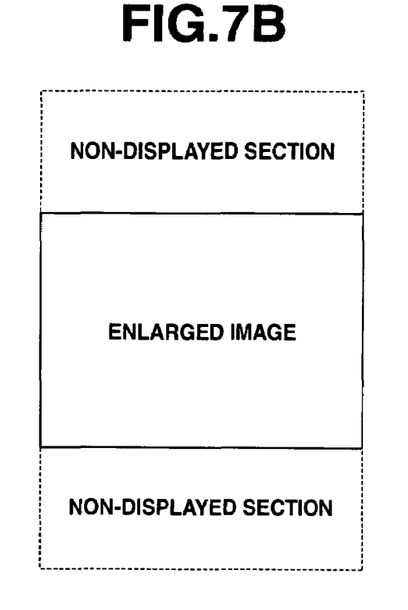

FIG. 7A, as in the case of FIG. 6A, shows a case where a vertically oriented rectangular frame is assigned by specifying the target pointers 1 and 2. In this case, the zooming ratio A in the horizontal direction is smaller than the zooming ratio B in the vertical direction, and therefore the image portion in the rectangular frame is enlarged by the zooming ratio A, and the enlarged image portion is projected as can be seen in FIG. 7B.

Figure 7C:
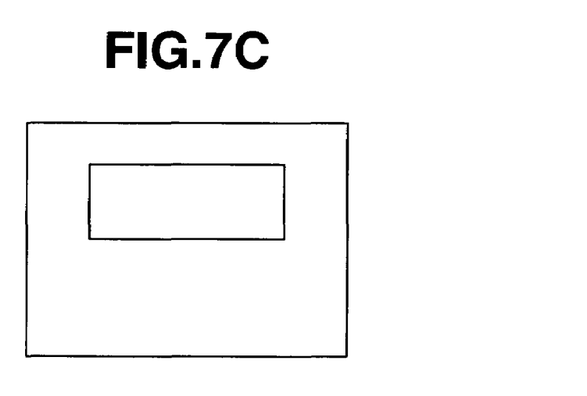
Figure 7D:
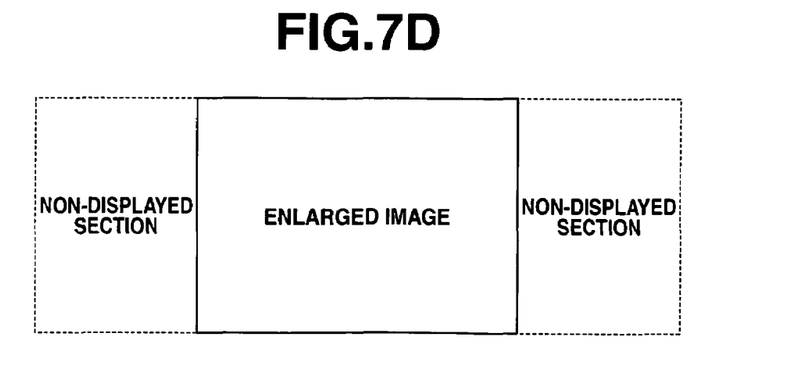

FIG. 7C, as in the case of FIG. 6C, shows a case where a horizontally oriented rectangular frame is assigned by specifying the target pointers 1 and 2. In this case, the zooming ratio B in the vertical direction is smaller than the zooming ratio A in the horizontal direction, and therefore the image portion in the rectangular frame is enlarged by the zooming ratio B, and the enlarged image portion is projected as can be seen in FIG. 7D.

In this case, the enlarged image of that image portion within the rectangular frame exceeds the size (X, Y) of the entire image. The central portion of the enlarged image, which matches with the size (X, Y) of the entire image, is extracted, and the extracted image portion is projected on the screen as the enlarged image.

As described above, an image portion is enlarged based on the side of the larger zooming ratio when zooming the portion. Thus, in the case where the region to be enlarged in the image is assigned by two points, it is not necessary to so precisely specify the desired image portion, but it suffices only if the image portion to be enlarged is set approximately at the center, to project the desired image portion on the screen.

In the above-provided descriptions, the rectangular frame that defines the portion to be zoomed up is defined by the target pointer 1 set at the upper left vertex and the target pointer 2 set at the lower right vertex. However, depending on the location of the target pointer 2 after setting the location of the target pointer 1, it is alternatively possible to set the target pointer 1 at the lower right vertex and the target pointer 2 at the upper left vertex.

Second Embodiment

Next, the second embodiment will now be described. The projector device 10 according to the second embodiment has such a structure that a two-point zoom key 15b as shown in FIG. 2B is provided in the main key and indicator unit 15. With this structure, the target points 1 and 2 described in connection with the first embodiment can be assigned by operating, respectively, a pointer 1 key 15b1 (first designating means) and a pointer 2 key 15b2 (second designating means) independently. Further, the remote controller has the same keys as those of the main body and with this controller, the same operations can be manipulated.

Figure 8:
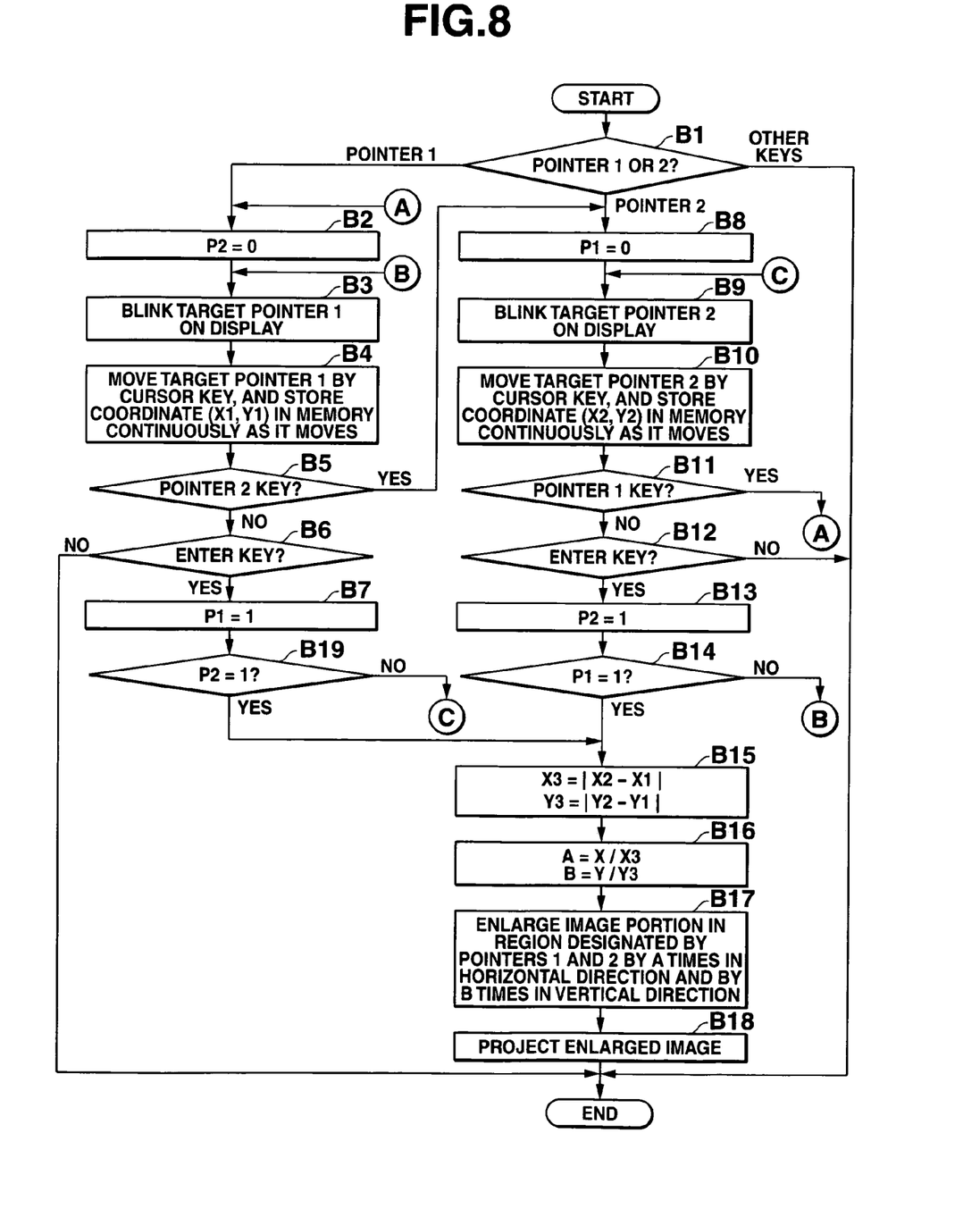
FIG. 8 is a flowchart illustrating an operation of the projector device 10 according to the second embodiment.

The operation of the projector device 10 of the second embodiment will now be described with reference to the flowchart shown in FIG. 8.

The projector device 10 receives an input of an image signal from, for example, a personal computer, via the input/output connector unit 18, and projects an image corresponding to the image signal on the screen.

Here, in order to enlarge (zoom up) a part of the image, either one of the pointer 1 key 15b1 and pointer 2 key 15b2 provided in the two-point zoom key 15b is arbitrarily manipulated to assign the target pointer 1 or the target pointer 2.

For example, when the pointer 1 key 15b1 of the two-point zoom key 15b is manipulated ("pointer 1" in step B1), the control unit 39 set a variable P2, which indicates the designated state of the target pointer 2, to "0", which indicates the pointer is not yet designated (step B2), and displays the target pointer 1 in a blinking manner at a location (, which is the same as in the first embodiment) that is initially set in the projected image (step B3).

Here, the cursor keys (the "Up" key 15k, the "Down" key 15l, the "Left" key 15m and the "Right" key 15n) are operated by the user, the control portion 39 moves the position of the target pointer 1 in accordance with the key operated, and the control unit 39 stores the coordinates (X1, Y1) of the target pointer 1 at the destination in the memory each time it is moved (step B4). In order to determine the region to be zoomed up in an image, the position of the target pointer 1 can be arbitrarily adjusted.

When the pointer 1 key 15b2 is manipulated while adjusting the position of the target pointer 1 ("Yes" in step B5), the control unit 39 set a variable P1, which indicates the designated state of the target pointer 1, to "0", which indicates the pointer is not yet designated (step B8), and displays the target pointer 2 in a blinking manner at a location (, which is the same as in the first embodiment) that is initially set in the projected image (Step B9).

Here, the cursor keys (the "Up" key 15k, the "Down" key 15l, the "Left" key 15m and the "Right" key 15n) are operated by the user, the control portion 39 moves the position of the target pointer 2 in accordance with the key operated, and the control unit 39 stores the coordinates (X2, Y2) of the target pointer 1 at the destination in the memory each time it is moved (step B10). In order to determine the region to be zoomed up in an image, the position of the target pointer 2 can be arbitrarily adjusted.

If the pointer 1 key 15b1 is manipulated while adjusting the position of the target pointer 2, the position of the target pointer 1 can be adjusted as described in the above. That is, the positions of the target pointers 1 and 2 can be independently assigned by manipulating the pointer 1 key 15b1 and the pointer 2 key 15b2.

On the other hand, when the "Enter" key 15o is operated ("Yes" in step B6) after the position of the target pointer 1 is adjusted (step B4), the control unit 39 sets the variable P1 to "1", which indicates that it is already assigned (step B7). Here, the control section 39 judges if the variable P2 is already assigned to "1", that is, if the positions of both the target pointers 1 and 2 are already determined (step B19). In the case where the variable P2 is assigned to "0", the operation is shifted to step B9, where the position of the target pointer 2 is assigned.

Similarly, when the "Enter" key 15o is operated ("Yes" in step B12) after the position of the target pointer 2 is adjusted (step B10), the control unit 39 sets the variable P2 to "1", which indicates that it is already assigned (step B13). Here, the control section 39 judges if the variable P1 is already assigned to "1", that is, if the positions of both the target pointers 1 and 2 are already determined (step B14). In the case where the variable P1 is assigned to "0", the operation is shifted to step B3, where the position of the target pointer 1 is assigned.

When the variables P1 and P2 are both set to "1" as the result of the above-described operations and the positions of both the target pointers 1 and 2 are determined ("Yes" in both of steps B14 and B19), the control section 39 calculates a length X3 of the side parallel to the X axis (that is, horizontal) in the rectangular frame defined by the two points set at the diagonal vertexes, and a length Y3 of the side parallel to the Y-axis (that is, vertical), based on the two coordinates (X1, Y1) and (X2, Y2) stored in the memory.

Then, for each of the vertical and horizontal sides of the rectangular axis, the zooming ratio used to enlarge the framed part to the size of the entire image is calculated. That is, the zooming ratio in the horizontal direction, that is, A=X/X3, and the zooming ratio in the vertical direction, that is, B=Y/Y3, are calculated (step B16).

The control section 39 enlarges the image portion selected within the rectangular frame defined by the target pointers 1 and 2 by the zoom processing unit 32a of the image processing unit 32, as calculated above, that is, A times in the horizontal direction and B times in the vertical direction (step B17).

Then, the control unit 39 controls the display encoder 33 to develop and store the image enlarged by the zoom processing unit 32a on the video RAM 34. Thus, the image portion within the rectangular frame defined by the two points is enlarged and projected on the entire screen (step B18).

As described above, in the second embodiment, the target pointers 1 and 2, which defines the rectangular frame specifying an image portion to be zoomed up, can be independently assigned, and therefore a designed image portion to be zoomed up can be easily set by adjusting the positions of the points in a simple manner.

In the second embodiment, there are two keys provided of the two-point zoom key 15b, namely the pointer 1 key 15b1 and the pointer 2 key 15b2. However, it is alternatively possible to have a single key structure in which a case of assigning the target pointer 1 and another case of assigning the target pointer 2 can be switched over.

In step B17, described above, the zooming up process is carried out based on the zooming ratios A and B, which are independently calculated, for each of the vertical and horizontal directions. However, it is alternatively possible to take such a structure that an image portion is enlarged by the zooming ration calculated for one of the directions as in the first embodiment.

Further, in both of the first and second embodiments, the position of an image portion to be zoomed in the image projected on the screen is assigned with use of the main key and indicator unit 15. However, it is alternatively possible to employ such a structure that the main body of the projector device 10 is provided with a display device such as a liquid crystal display, to display the same image projected on the screen, and a touch sensor (tablet) applied on and integrated with the display screen of the display device. With this structure, the position of the image portion can be assigned by operating on the touch sensor.

Third Embodiment

Next, the third embodiment of the present invention will now be described. In the first and second embodiments, the two points that defines an image portion to be enlarged are assigned by operating the keys provided in the main key and indicator unit 15 as well as the remote controller. By contrast, in the third embodiment, the two points that defines an image portion to be enlarged are assigned directly by a laser beam applied onto the image projected on the screen using a laser pointer 50.

Figure 9:
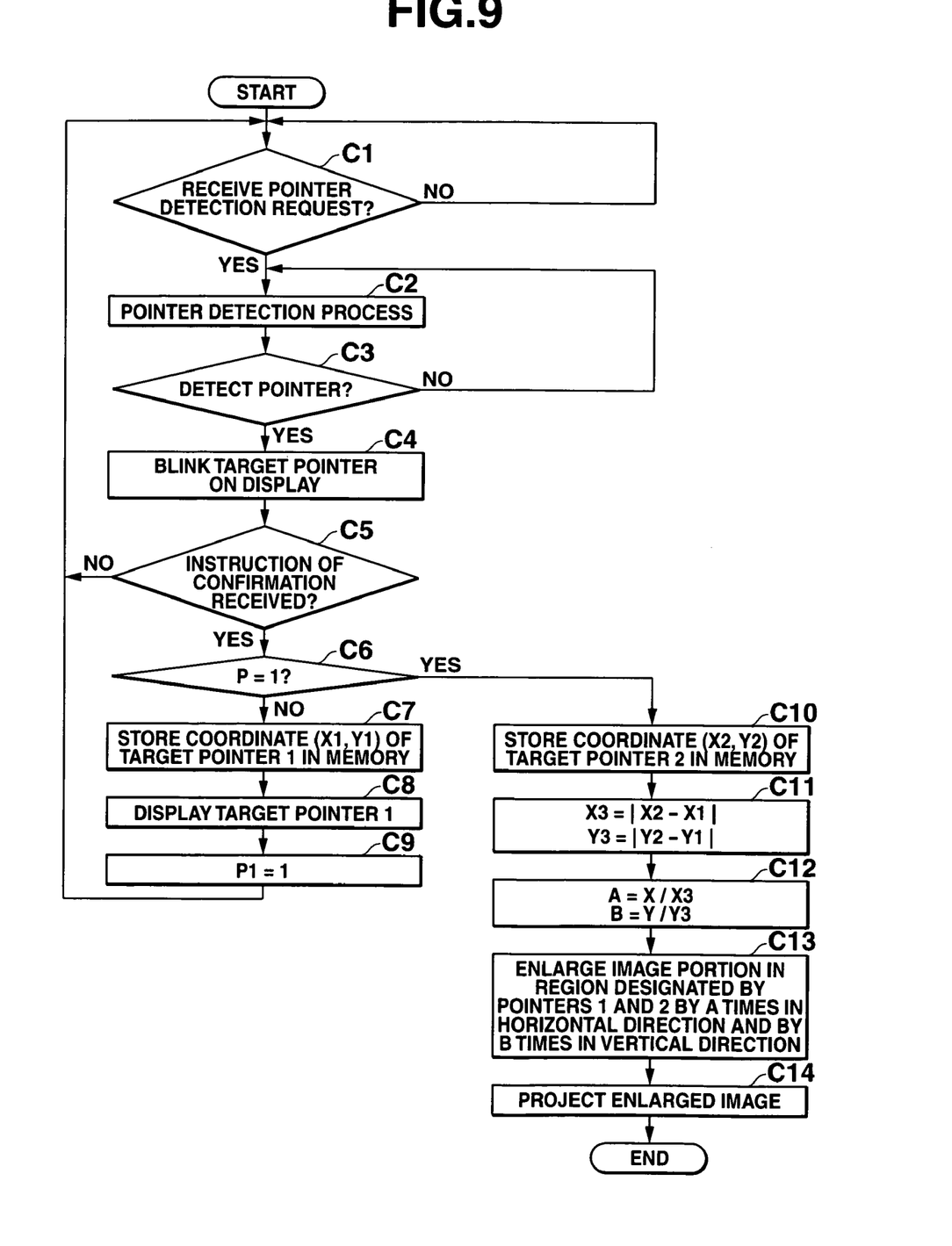
FIG. 9 is a flowchart illustrating an operation of the projector device 10 according to the third embodiment.

The operation of the projector device 10 in the third embodiment will now be described with reference to a flow chart shown in FIG. 9.

The projector device 10 receives image signals from, for example, a personal computer via the input/output connector unit 18, and projects an image corresponding to the image signals on the screen. Then, a laser light beam is applied by operating (pushing only a half way through) a button 51 (first button) of the laser pointer 50 onto the image projected on the screen, so as to arbitrarily assign the position of the image portion to be zoomed up.

In order to enlarge (zoom up) the image portion, the button 51 (first button) of the laser pointer 50 is operated by pushing it all the way through while positioning the laser beam applying position to the image portion to be enlarged. With this operation, a control unit 52 of the laser pointer 50 receives the notification of the first button pushed all the way through from the input control unit 53, and controls a communication unit 55 to transmit a request of detecting the position instructed by the laser beam output (that is, a pointer detection request) from a laser beam output unit 54, to the projector device 10 in accordance with the operation of the first button.

When the projector device 10 receives the pointer detection request from the laser pointer 50 via the communication unit 43 (step C1), the pointer detection process is executed to detect the position on the screen instructed by the laser beam from the laser pointer 50 (step C2). More specifically, the screen on which the image is projected is shot (scanned) by the shooting unit 42 to detect the position where the laser beam is applied.

For example, when the cross section of the laser beam applied from the laser pointer 50 onto the screen is pre-designed to a certain shape, the position indicated by the laser beam can be detected by extracting the corresponding shape out of the image shot by the shooting unit 42 by image processing. Alternatively, a predetermined color of the laser light may be used. In this case, the position indicated by the laser beam can be detected based on the color. Further, it is possible that the shooting unit 42 is designed to shoot the image with input of light of the wavelength of the laser beam output from the laser pointer 50, and thus the position designated by the laser beam is detected from thus shot image.

When the control unit 39 detects the position designated by the laser pointer 50 (step C3), it determines what part of the entire image is designated from the correlation between the detected position and the position in the image projected on the screen. Then, the control unit 39 displays the target pointer 1 at the determined position in a blinking manner (step C4).

Here, when the button 51 (first button) is operated as described before, the position of the target pointer 1 can be arbitrarily changed (steps C1 to C4).

On the other hand, when the second button of the button 51 is pushed, the control unit 52 is notified that the second button is operated from the input control unit 53, and then the control unit 52 transmits an instruction of confirmation to the projector device 10 in accordance with the operation.

When the projector device 10 receives the instruction of confirmation from the laser pointer 50 via the communication unit 43 (step C5), the control unit 39 identifies if a variable P, which indicates the state of the target pointer 1 as to whether it is already assigned, is set to "1", which indicates that it is already assigned (step C6). It should be noted that the initial status of the variable P is set to "0".

Here, when the variable P is not set to "1", the control unit 39 stores the coordinates (X1, Y1) of the target pointer 1 at that situation in the memory, and the position of the target pointer 1 is determined (step C7). The control unit 39 adds and display a mark indicating the target pointer 1 to the image projected on the screen (step C8). Then, the variable P is set to "1" to indicate the target pointer 1 has already been assigned (step C9).

Next, as described before, the button 51 is pushed all the way through to detect the position of the target pointer 2 indicated by a laser beam, and the target pointer 2 is displayed at the detected position in a blinking manner (step C4). Here, when the instruction of confirmation is received by the operation of the button 51 (first button) of the laser pointer 50 is operated by pushing it all the way through while via the communication unit 43 (step C5), the control unit 39 identifies if a variable P, which indicates the state of the target pointer 1 as to whether it is already assigned, is set to "1", which indicates that it is already assigned (step C6).

In the case, the variable P is set to "1", the control unit 39 stores the coordinates (X2, Y2) of the target pointer 2 at that situation in the memory, and the position of the target pointer 2 is determined (step C10).

Thus, the positions indicated by the laser beam of the laser pointer 50 are set as the target pointers 1 and 2, and the coordinates (X1, Y1) and (X2, Y2) of these positions are detected. Then, the same processings as those of the steps B15 to B18 in the second embodiment are carried out here in steps C11 to C14, and thus the image portion within the rectangular frame defined by the two points is enlarged and projected on the screen.

As described above, in the third embodiment, the main key and indicator unit 15 provided for the projector device 10 are not operated, but instead, the laser pointer 50 which is provided independently from the main body of the projector device 10 is manipulated from a position away from the projector device 10. Merely with the manipulation of the laser pointer 50 described above, the rectangular frame that defines the image portion to be zoomed up is set by assigning the two points on the image projected on the screen, and thus the image portion is enlarged and projected on the screen.

Fourth Embodiment

Next, the fourth embodiment of the present invention will now be described. In the third embodiment, the two points that defines an image portion to be enlarged are assigned directly by a laser beam applied onto the image projected on the screen using the laser pointer 50. By contrast, in the fourth embodiment, the two points that defines an image portion to be enlarged are assigned based on the track of the laser beam applied onto the image projected on the screen using the laser pointer 50.

Figure 10:
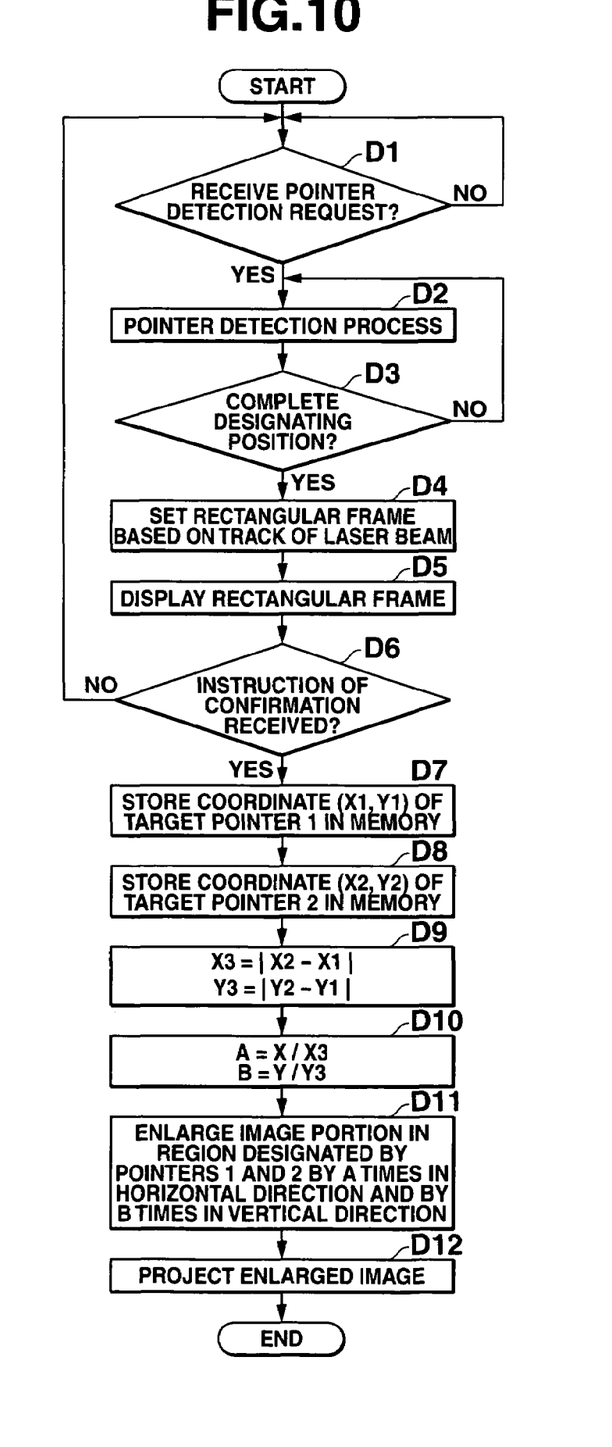
FIG. 10 is a flowchart illustrating an operation of the projector device 10 according to the fourth embodiment.

The operation of the projector device 10 in the fourth embodiment will now be described with reference to a flow chart shown in FIG. 10.

The projector device 10 receives image signals from, for example, a personal computer via the input/output connector unit 18, and projects an image corresponding to the image signals on the screen. Then, a laser light beam is applied by operating (pushing only a half way through) a button 51 (first button) of the laser pointer 50 onto the image projected on the screen, so as to arbitrarily assign the position of the image portion to be zoomed up.

In order to enlarge (zoom up) the image portion, the position of the laser beam applied on the image is moved to indicate the image portion to be enlarged while pushing the button 51 (first button) of the laser pointer 50 all the way through.

With this operation, the control unit 52 of the laser pointer 50 receives the notification of the first button pushed all the way through from the input control unit 53, and controls the communication unit 55 to transmit a request of detecting the position instructed by the laser beam output (that is, a pointer detection request) from the laser beam output unit 54, to the projector device 10 in accordance with this operation. The pointer detection request is continuously transmitted while the button 51 (the first button) is being pushed all the way through.

When the projector device 10 receives the pointer detection request from the laser pointer 50 via the communication unit 43 (step D1), the pointer detection process is executed to detect the position on the screen instructed by the laser beam from the laser pointer 50 (step D2). More specifically, the screen on which the image is projected is shot (scanned) by the shooting unit 42 to detect the position where the laser beam is applied. The detection of the position where the laser beam is applied can be carried out in the same way as in the third embodiment.

In the fourth embodiment, the change in the position of the laser beam moved around to indicate the region to be enlarged in the image, that is, the track of the laser beam, is detected by the above-described manner. That is, the position indicated by the laser beam is continuously detected while the button 51 is pushed all the way through (that is, while the pointer detection request is being received).

The control unit 39 detects the positions designated by the laser pointer 50 one after another, and stores the positions that indicate the track of the laser beam consecutively (steps D2 and D3).

When the button 51 is released from being pushed all the way through and the receiving of the pointer detection request is stopped, the control unit 39 judges that the designation of the region to be enlarged in the image is completed ("Yes" in step D3).

Based on the track of the laser beam stored, the control unit 39 sets the rectangular frame that defines the image portion to be enlarged (step D4). In order to set the position of the region to be enlarged in the image, this embodiment employs, for example, either one of a first method that sets the region by the track between the two points, one for the starting point and the other for the ending point, of the diagonal of the rectangular frame as shown in FIG. 11A and a second method that sets the region by the track that surrounds the region circumscribing the rectangular frame as shown in FIG. 12A.

Figure 11A:
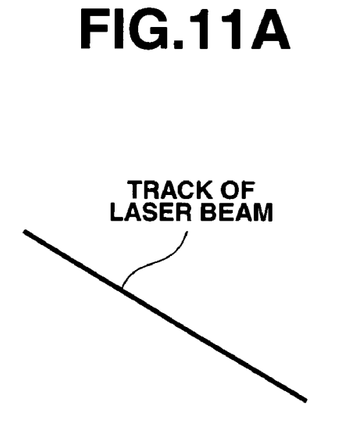
FIGS. 11A and 11B diagrams showing an example of setting of a rectangular frame based on a track of the pointer in the fourth embodiment.
Figure 11B:
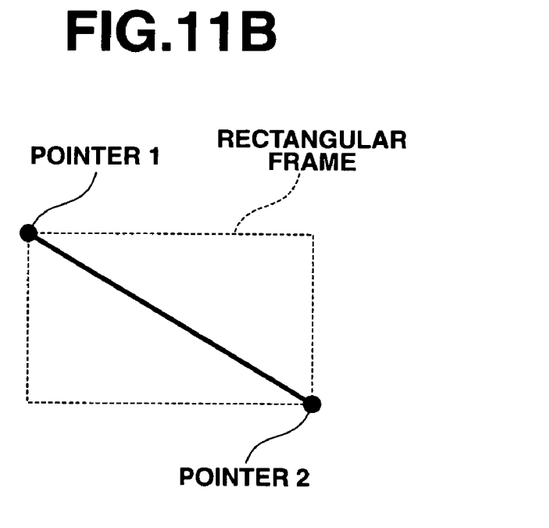
Figure 12A:
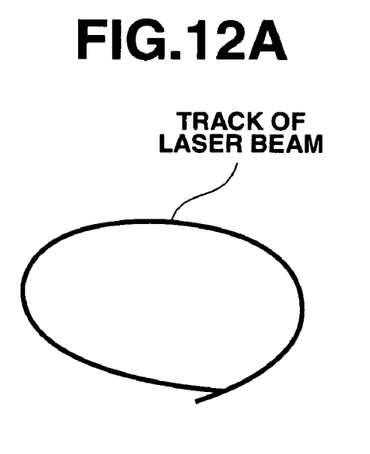
FIGS. 12A and 12B diagrams showing another example of setting of a rectangular frame based on a track of the pointer in the fourth embodiment.
Figure 12B:
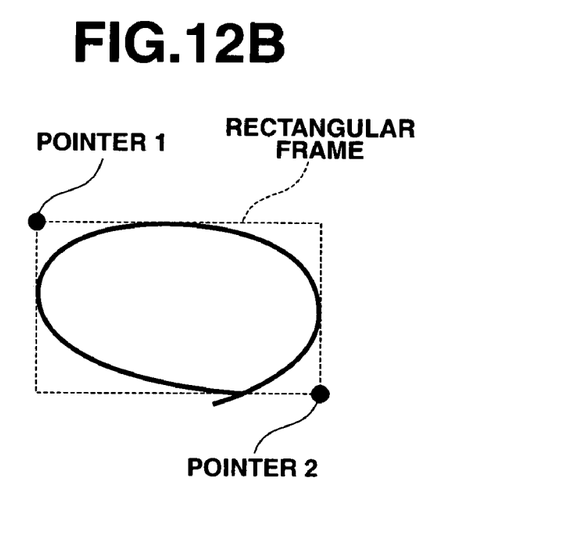

According to the first method, the control unit 39 sets the rectangular frame defined by the two points of the diagonal, which is the starting point and ending point of the track as shown in FIG. 11B based on the track of the laser beam as shown in FIG. 11A. According to the second method, the control unit 39 sets the region by the track that surrounds the region circumscribing the rectangular frame as shown in FIG. 12B, based on the track of the laser beam as shown in FIG. 12A. Each of the sides that form the rectangular frame is set to be in parallel to the X axis or Y axis.

It should be noted here that the track of the laser beam shown in 12A surrounds the region as part of it crosses another part (or contacts to another part); however it should be able to set the rectangular frame even if the track does not crosses (or contacts). For example, the rectangular frame may be set based on line segments parallel to the Y axis, that come in contact to the trace of the laser beam and have the maximum and minimum X coordinates, and line segments parallel to the X axis, that come in contact to the trace of the laser beam and have the maximum and minimum Y. Further, FIG. 12B shows the case where the rectangular frame it set to circumscribe the region surrounded by the track, but it is also possible to set the rectangular frame to touch within the region surrounded by the track.

After setting the rectangular frame, the control unit 39 determines what part of the entire image is designated from the correlation between the position of the trace designated by the laser beam and the position in the image projected on the screen, and then it displays the rectangular frame at the determined position in a blinking manner (step D5).

Here, when the button 51 (first button) is operated as described before, the position of the rectangular frame can be arbitrarily changed (steps D1 to D5).

On the other hand, when the second button of the button 51 is pushed, the control unit 52 is notified that the second button is operated from the input control unit 53, and then the control unit 52 transmits an instruction of confirmation to the projector device 10 in accordance with the operation.

When the projector device 10 receives the instruction of confirmation from the laser pointer 50 via the communication unit 43 (step D6), the projector device 10 then determines the target pointers 1 and 2 that indicate the position of the rectangular frame set based on the track of the laser beam. More specifically, the control unit 39 stores the coordinates (X1, Y1), which is, for example, the upper left vertex of the rectangular frame as the target pointer 1 in the memory, and thus the position of the target pointer 1 is determined (step D7). Then, the control unit 39 stores the coordinates (X2, Y2), which is, for example, the lower right vertex of the rectangular frame as the target pointer 2 in the memory, and thus the position of the target pointer 2 is determined (step D8).

As described above, the positions of the target pointers 1 and 2 are determined from the rectangular frame set based on the track instructed with the laser beam of the laser pointer 50, and the coordinates (X1, Y1) (X2, Y2) are detected. Then, the same processings as those of the steps B15 to B18 in the second embodiment are carried out here in steps D9 to D12, and thus the image portion within the rectangular frame defined by the two points is enlarged and projected on the screen.

As described above, in the fourth embodiment, the main key and indicator unit 15 provided for the projector device 10 are not operated, but instead, the laser pointer 50 which is provided independently from the main body of the projector device 10 is manipulated from a position away from the projector device 10. Merely with the manipulation of the laser pointer 50 described above, the rectangular frame that defines the image portion to be zoomed up is set by the track of the laser beam as indicated in FIGS. 11A or 12A on the image projected on the screen, and thus the image portion is enlarged and projected on the screen.

It should be noted here that in the first to fourth embodiments are described in connection with the case where a portion (region) to be enlarged in an image is designated with a rectangular; but the shape may be arbitrary and some other shape may be employed to set the region. For example, by setting three or more points arbitrarily, a region to be enlarged can be set by a polygon of an arbitrary shape. Further, in the fourth embodiment, a region of an arbitrary shape can be designated by setting the track of the laser beam using the laser pointer 50.

Thus, in the case where the region to be enlarged is designated in an arbitrary shape, the length based on which the region of the image is to be enlarged is determined based on the shape of the region as in the same manner as described in the first to fourth embodiments. For example, as described in connection with the fourth embodiment, the rectangular frame that circumscribes the region of an arbitrarily designated shape is set, and the length of one of the sides of the rectangular shape can be used as a reference for enlargement as show in FIG. 12B. Alternatively, for example, the rectangular frame that is placed with the region of an arbitrarily designated shape is set, and the length of one of the sides of the rectangular shape can be used as a reference for enlargement. In this case, the rectangular frame placed within the region should be set such that, for example, at least one of the vertexes of the rectangular frames comes in contact (coincides) with an end portion of the region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector device comprising:
a track detection unit that detects a track designated by an optical pointer on a projected image;
a region designating unit that designates a specific region based on the track detected by the track detection unit;
a determining unit that determines a length as a reference for enlargement of an image portion defined within the region designated by the region designating unit;
an image enlarging unit that enlarges the image portion in the region based on the length as the reference determined by the determining unit and a size of an entire image; and
an enlarged image projecting unit that projects the enlarged image enlarged by the image enlarging unit.

2. The projector device according to claim 1, further comprising a shooting unit that shoots the projected image;
wherein the track detection unit detects the track designated by the optical pointer on the image shot by the shooting unit.

3. The projector device according to claim 1, wherein the region designating unit designates a rectangular frame based on the track detected by the track detection unit.

4. A projector device comprising:
a position designating unit that designates positions of at least two points on a projected image;
a setting unit that sets a region having a configuration which is based on the points designated by the position designating unit;
a determining unit that determines a length of a reference for enlargement of an image portion defined within the region having the configuration based on the designated points set by the setting unit;
an image enlarging unit that enlarges the image portion in the region having the configuration based on the designated points, based on the length of the reference determined by the determining unit and a size of an entire image; and
an enlarged image projecting unit that projects the enlarged image enlarged by the image enlarging unit.

5. The projector device according to claim 4, wherein the determining unit determines the length based on a side of a smaller zooming ratio for the enlargement of the image portion by the image enlarging unit.

6. The projector device according to claim 4, further comprising a reference setting unit that sets a side to be used as a reference for enlargement of the image portion by the image enlarging unit,
wherein the determining unit determines the side set by the reference setting unit as a reference for enlargement of the image portion.

7. The projector device according to claim 4, wherein the position designating unit includes:
a first designating unit that designates a position of a first point;
a first point determining unit that determines the position of the first point designated by the first designating unit;
a second designating unit that designates a position of a second point; and p1 a second point determining unit that determines the position of the second point designated by the second designating unit;
wherein the two points determined based on both of the first point and second point entered by the first point determining unit and the second point determining unit are set as a designated position.

8. The projector device according to claim 4, wherein the position designating unit designates the position of the two points indicated by the laser beam on the projected image.

9. The projector device according to claim 8, further comprising a shooting unit that shoots the projected image;
wherein the position designating unit detects the position of the two points indicated by the laser beam on the image shot by the shooting unit.

10. The projector device according to claim 4, wherein the setting unit sets a rectangular frame having vertexes of a diagonal coincide with the two points designated by the position designating unit.

* * * * *